United States Patent [19]

Gebauer et al.

[11] 4,255,462

[45] Mar. 10, 1981

[54] METHOD OF PRODUCING POLYVINYLIDENE FLUORIDE COATINGS

[75] Inventors: Peter Gebauer; Wilhelm Käufer, both of Troisdorf; Helmut Möhrke, Troisdorf-Sieglar, all of Fed. Rep. of Germany

[73] Assignee: Dynamit Nobel Aktiengesellschaft, Troisdorf, Fed. Rep. of Germany

[21] Appl. No.: 929,609

[22] Filed: Jul. 31, 1978

Related U.S. Application Data

[62] Division of Ser. No. 746,442, Dec. 1, 1976, Pat. No. 4,185,000.

[30] Foreign Application Priority Data

Dec. 5, 1975 [DE] Fed. Rep. of Germany ....... 2554765

[51] Int. Cl.$^3$ .............................................. B05D 1/06
[52] U.S. Cl. ...................................... 427/27; 427/185; 427/195; 427/201; 428/421
[58] Field of Search ................ 427/195, 375, 27, 185, 427/701; 260/42.27; 428/421

[56] References Cited

U.S. PATENT DOCUMENTS

| | | | |
|---|---|---|---|
| 2,990,294 | 6/1961 | Long | 427/375 |
| 3,473,952 | 10/1969 | McFadden | 260/42.27 |
| 3,824,115 | 7/1974 | Segawa et al. | 260/42.27 |
| 3,850,867 | 11/1974 | Hartmann | 260/42.27 |
| 3,903,045 | 9/1975 | Chandrasekaran | 260/45.75 T |
| 3,928,703 | 12/1975 | Cook | 427/375 |
| 3,935,159 | 1/1976 | Demillecamps et al. | 260/42.27 |
| 3,936,569 | 2/1976 | Miller et al. | 427/195 |
| 3,998,770 | 12/1976 | Malhotra | 260/42.18 |
| 4,107,356 | 8/1978 | Ukihashi et al. | 106/307 |

*Primary Examiner*—Shrive P. Beck
*Attorney, Agent, or Firm*—Sprung, Felfe, Horn, Lynch & Kramer

[57] ABSTRACT

A powder coating composition comprising a homopolymer or copolymer of polyvinylidene fluoride having a melt flow index of 10 to 300 grams per ten minutes, determined in accordance with ASTM D 1238, Condition J and 5 to 50 weight percent of a glass having a grain size of 1 to 300 μm; an improvement in a method of coating a metal or inorganic oxidic surface wherein a powder coating composition containing polyvinylidene fluoride is applied to such surface and fused thereon, the improvement residing in employing as the powder coating composition one containing 5 to 50 weight percent glass, based upon the weight of the polyvinylidene fluoride polymer; a coated object having a metallic or inorganic oxidic surface which is coated with a polyvinylidene fluoride homopolymer or copolymer which coating contains 5 to 50 weight percent, based upon the weight of the polyvinylidene fluoride, of glass particles, especially glass particles of a grain size of 1 to 300 μm.

5 Claims, No Drawings

METHOD OF PRODUCING POLYVINYLIDENE FLUORIDE COATINGS

This is a division of application Ser. No. 746,442, filed Dec. 1, 1976, now U.S. Pat. No. 4,185,000.

BACKGROUND OF THE INVENTION

1. Field of the Invention

The subject matter of the present invention is a method of preparing polyvinylidene fluoride (PVDF) coatings on metal and inorganically oxidic surfaces by powder coating, the PVDF in powder form being fused onto the surface in the presence of an adhesivizing filler during or after application. The new coating powder that is used for the purpose is also subject matter of the present invention.

2. Discussion Of The Prior Art

The use of PVDF for the production of coatings by powder coating has been known for some years. The application methods include the fluidized bed coating method with its variants, the electrostatic powder coating method, powder coating with compressed-air, flame spraying, and the electrostatic fluid bed process. In all these processes, the maintenance of the strength of adhesion is of special importance, especially in the case of contact with aggressive chemicals at high temperatures.

Unless special measures are taken in the above-named coating processes, diffusion processes and shrinkage processes take place in the substrate-and-coating system when this system is exposed to elevated temperatures, especially in the presence of aggressive chemicals. These processes within a short time result in a reduction of the strength of adhesion, resulting in sagging and in separation of the coating from the substrate.

To avoid these difficulties it has been proposed to apply to the substrate, prior to the baking-on of the PVDF coating, an adhesivizing agent consisting of a mixture of epoxy resins and PVDF dispersions (cf. U.S. Pat. No. 3,111,426). These adhesivizing agents have the disadvantage that they are thermally sensitive and have to be applied to the substrate by a time-consuming process.

It is furthermore known, through German Offenlegungsschrift, to improve the adhesion of PVDF coatings applied to a substrate by powder coating, by applying to the substrate, prior to the coating procedure, an adhesivizing primer containing, in addition to various amounts of PVDF, at least one inorganic substance of high resistance to acids and alkalies. This primer is applied by powder coating, thereby avoiding by disadvantages of the method of U.S. Pat. No. 3,111,426. The inorganic substances used in this method, such as silicon dioxide (quartz sand), graphite or chromium oxide, for example, give the surface of the primer a gritty structure which cannot be leveled out by a PVDF cover coat applied over it. The result is reduced resistance to wear in the coatings thus obtained.

Another disdvantage of these coatings lies in their insufficient porosity. Metallic objects which are covered with such coatings are therefore not sufficiently protected against corrosion, since in the course of time rusting and more or less severe corrosion occurs at the insufficiently sealed areas.

The problem therefore existed in providing PVDF coatings which can be applied to the substrate by powder coating, which will have better adhesion to the substrate, and which will have a very smooth surface. Furthermore, the coating thus obtained is to be nonporous.

SUMMARY OF THE INVENTION

Broadly, this invention contemplates a powder coating composition comprising a homopolymer or copolymer of polyvinylidene fluoride having a melt flow index of 10 to 300 grams per ten minutes, determined in accordance with ASTM D 1238, Condition J and 5 to 50 weight percent of a glass having a grain size of 1 to 300 $\mu$m.

This invention further contemplates an improvement in the method of coating a metal or inorganic oxidic surface wherein a powder coating composition containing polyvinylidene fluoride is applied to said surface and fused thereon, the improvement residing in employing as the coating composition one containing 5 to 50 weight percent glass, based upon the weight of the polyvinylidene fluoride polymer.

Where the use of glass in conjunction with a polyvinylidene fluoride polymer is mentioned herein, it is to be understood that, broadly, many glass particles can be employed although it is especially contemplated to use glass particles of a size of 1 to 300 $\mu$m, preferably glass particles of a size of 5 to 100 $\mu$m.

In accordance with this invention, it has been found that when powder coating compositions based upon polyvinylidene fluoride include, as an adhesivizing filler, glass, especially in the amount of 5 to 50 percent by weight based upon the weight of the polymer, that the aforementioned problems in respect of obtaining suitable coatings containing polyvinylidene fluoride are overcome.

If a coating of powder is applied in accordance with the invention to a metal substrate by a fluidized bed coating process, the above-named disadvantages of the known methods are not encountered. The polyvinylidene fluoride containing glass spheres adheres firmly to the metal and has a virtually smooth surface. Furthermore, the coating obtained is non-porous, as proven by testing with a high-voltage pore seeking apparatus obtainable commercially. In these tests, no spark discharge occurred as it did in the case of the coatings prepared in accordance with the method of German Offenlegungsschrift No. 2,028,670.

In the present method, it is also advantageous that, by a single powder coating procedure, a coating is obtained which completely satisfies the requirements which must be met by a PVDF coating. The disadvantages encountered in the above-named known two-coat methods, such as, for example, the time-consuming prime coating or the stocking of two or more types of powder, are eliminated.

The glass is used preferably in balls, spheroids or similar egg-like bodies of a diameter of 5 to 150 $\mu$m. This geometrical shape brings with it the further advantage over the known methods that, in the fluidized bed coating process the powder has a completely pulsation-free, uniform floating movement, with a constant surface level. In this manner, particularly uniform coatings can be obtained by fluidized bed coating, and a sharp local definition of the coating is possible. Furthermore, the glass balls reduce to a special degree the shrinkage of the coating upon the cooling of the melt, so that good edge coverage is achieved and the danger of crazing due to concentration of tensions at the edges is prevented.

Furthermore, the internal tensions are relieved and the thermal expansion is clearly reduced. The surface hardness and the resistance to wear of the coatings are considerably increased by the glass ball content. In the case of scraping or scratching stress, no attrition occurs as it does in PVDF powders with quartz sand filler.

The glass balls to be used in accordance with the invention can consist of glasses of various composition, the term glass, as used herein, being understood as an amorphous mixture of inorganic compounds solidified from the molten state, which consists mainly of simple and composite silicates, borates, phosphates and oxides of sodium, potassium, magnesium, aluminum, barium, zinc and lead, or mixtures of these compounds.

The glasses differ from the inorganic substances named in German Offenlegungsschrift No. 2,028,670 in that they represent a uniform, amorphous mixture of various substances which is obtained from the molten phase, the new substance having specific material properties peculiar to glass, and in which the properties of its inorganic starting substances are no longer recognizable. The inorganic substances of German Offenlegungsschrift, however, retain in a mixture the characteristic properties of the individual substances, so that such a mixture does not constitute a homogeneous mixture of substances having uniform properties. The specific characteristics of the glass are of great importance to the effects produced in accordance with the invention.

A few typical glasses, for example, have the following composition:

| Components (in %) | E Glass | C Glass | A Glass | R Glass |
| --- | --- | --- | --- | --- |
| $SiO_2$ | 54.0 | 65.0 | 72.5 | 60.0 |
| $Al_2O_3(+Fe_2O_3)$ | 15.0 | 4 | 1.5 | 25.0 |
| $B_2O_3$ | 8.0 | 5.0 | — | — |
| CaO | 18.0 | 14.0 | 9.0 | 9.0 |
| MgO | 4.0 | 3.0 | 3.5 | 6.0 |
| $Na_2O + K_2O$ | 0.8 | 8.0 | 13.0 | — |
| Other | 0.2 | 1.0 | 0.5 | — |

It is advantageous to pretreat the surfaces of the glass balls with appropriate compounds in a known manner in order, on the one hand, to achieve a good bond between the glass and the plastic, and, on the other hand, to produce a good bond between the glass and the substrate. Suitable substances are the known coupling agents, preferably organofunctional silanes such as, for example, vinyltrialkoxy silanes, aminoalkyltrialkoxy silanes, or their N-substitution products, or silanes containing epoxy groups, such as for example the glycidyloxypropyltrialkoxy silanes.

The above-mentioned glass balls are added to the PVDF powder in amounts of 5 to 50 wt.−%, preferably 10 to 40 wt.−%. The special advantage of glass balls is that the spheroidal shape permits a higher degree of filling in comparison to other additives, since the balls produce a lesser increase in the viscosity of the melt than materials of irregular geometry.

Both PVDF homopolymers and PVDF copolymers can be used as the polymers. The melt index of these polymers, determined according to ASTM D 1238, Condition J, under a weight load of 12.5 kp, at a temperature of 265° C., can range from 10 to 300 grams per 10 minutes, preferably from 20 to 250 grams per 10 minutes. The melt index used in each case will be governed by the melt viscosity required in the PVDF melt. In the case of thin pieces of low heat capacity, high melt indices are required in order to achieve a good surface flow, while thick-walled pieces of high heat capacity require lower values in order to prevent the melt from dripping off from the substrate.

When a PVDF copolymer is used, the comonomer content is from 1 to 20 wt.−%, preferably 2.5 to 10 wt.−%, with respect to the copolymer. Examples of comonomers for the copolymers are vinyl fluoride or hexafluoropropylene. The preparation of the PVDF homopolymer or copolymer can be accomplished in accordance with available polymerization techniques for the preparation of polyvinylidene fluoride, but the suspension polymerization process is preferred.

Preferably, there is employed a polyvinylidene fluoride homopolymer or copolymer having a melt flow index of 10 to 300 grams per ten minutes, determined in accordance with ASTM D 1238, Condition J. Such a homopolymer or copolymer can suitably be prepared in accordance with the procedure described in U.S. patent application Ser. No. 887,754, filed Dec. 23, 1969. (=DT-OS No. 2063248)

The powder coatings produced by this method can be applied to the substrate surfaces by any desired powder-coating method, but fluidized bed coating and electrostatic powder coating are preferred. The working temperatures vary between 250° and 500°, depending on the method of application and the heat capacity of the substrate. The single-layer coating, which is adequate in itself, and which can also be applied in several coating steps to achieve great coating thicknesses, using the same powder in each case, can of course be coated with additional layers of pigmented or unpigmented PVDF powder.

The PVDF powder used has grain size distributions centering around, for exmple, 50 to 450 $\mu$m in the fluidized bed coating process, and 20 to 200 $\mu$m in the case of electrostatic powder coating processes. These grain sizes are not obligatory but have proven to be especially desirable for these particular application methods.

Both metals and inorganically oxidic surfaces are suitable as substrates, iron and its alloys and aluminum and its alloys being preferred metal substrates.

By the term "organically oxidic materials" are meant principally ceramic objects or objects of glass, ceramic or grog.

Additional subject matter of the invention is a coating powder on a basis of PVDF homopolymer or copolymer with contents of from 5 to 50 wt.−%, with respect to the polymer, of spherical glass of a grain size of 1 to 250 $\mu$m, the range from 5 to 150 $\mu$m being preferred.

By the invention it is now made possible to simplify substantially the process of coating with PVDF powder, inasmuch as the previous application of adhesivizing components, followed by drying and baking on for the achievement of effective adhesion to the substrate even despite chemical and thermal attack, and for the achievement of a smooth, non-porous surface, is eliminated, and furthermore, even the two-layer application, consisting of an adhesivizing primer and a smoothing and pore-closing second coat, is no longer necessary.

The preparation of the PVDF coating powder containing glass balls and, if desired, pigments, is performed by intimately mixing together the glass balls and the PVDF powder in the grain size that is suitable for the particular coating method involved.

Such a mixture can contain pigments suitable for the coloring of the coating, and they can be incorporated in the same mixing procedure. These pigments must have not only good compatibility with PVDF but also an approximately equally good chemical resistance so as not to impair the protective action of the coating. Among such pigments, which are added in amounts of 0.1 to 10% of the weight of the polymer depending on the intensity of their coloring action, are chromium oxide, cobalt oxide, iron oxide, nickel oxide, manganese oxide, copper oxide, zinc oxide, carbon black, cadmium pigments, and mixtures of these pigments.

Some of the metal oxides listed in this series and serving as pigments can, under certain circumstances, lead to the formation of local Galvanic cells on metal surfaces; the reaction with the substrate surface can result in an additional mechanical anchoring of the coating, which has a decided effect on the strength of adhesion. One can, also, apply a pigmented, coloring coating of PVDF in addition to a coating containing glass balls.

The mixing process is performed cold, i.e., it does not make use of the molten phase of PVDF, although this is possible. All mixers which are capable of preparing homogeneous powder mixtures are suitable for the performance of the mixing process, i.e., either free-fall mixers of the various types, or slowly running high-speed mixers can be used.

EXAMPLES

In order to more fully illustrate the nature of the invention and the manner of practicing the same, the following examples are presented:

EXAMPLE 1

Steel plates measuring 150×60×3 mm, having rounded edges and corners, were sandblasted and degreased in perchlorethylene vapor. They then were preheated in a circulating air oven at 350° C. oven temperature for a period of 15 minutes, and dipped into a fluidized bed of PVDF powder. The PVDF powder consisted of a intimate mixture of 80 weight-parts of PVDF of a grain size between 60 and 350 μm, with a melt index of 150 g/10 min (in accordance with ASTM D 1238, Condition J), and 20 weight-parts of glass balls made from "A" glass and having a size between 5 and 160 μm. The dipping procedure was terminated after 4 to 8 seconds, depending on the coating thickness to be applied. The plates were then heated for 10 minutes at 300° C., while the final fusing of the powder particles took place. Then the plates were cooled to room temperature. The applied coating thicknesses were 380 and 600 μm.

The surfaces of the plates had a good to very good smoothness with only a slight texturing.

The test for adhesion was performed by long-term immersion of the plates either in 20% hydrochloric acid at 80° C. or in boiling water. In all cases there was no loss of adhesion upon immersion for up to 144 hours. Neither was any optically detectable alteration observed in the coating or in the surface of the plate.

The coatings were furthermore tested for porosity, using a high-voltage pore seeking apparatus in conjunction with a broom electrode. The test voltage was 10 kV. The number of flashovers was determined. Since this test is dependent upon the thickness of the coating, specimens bearing a PVDF coating thickness of 750 μm were also tested.

The results of the tests are shown in Table 1.

EXAMPLE 2

(Comparative Example)

As in Example 1, steel plates of the same quality and thickness, pretreated in the same manner as in Example 1, were provided with a PVDF coating. However, instead of glass balls, the same amount of quartz sand of approximately the same grain size spectrum was added to the PVDF powder of the same melt viscosity and grain size spectrum.

The coatings obtained had a thickness between 500 and 600 μm. The surface, however, was very irregularly covered and had a pronounced texture.

The tests for adhesion and porosity were performed in the same manner as described in Example 1. The coating thicknesses were the same as in the specimens of Example 1.

During immersion in hydrochloric acid, the PVDF coating lifted off by itself after only 24 hours, without the application of external force. Severe alterations were observable both on the surface of the plates (rusting, discoloration) and on the coating (spots and bubbles).

After 24 hours of immersion in boiling water, the coating could be lifted and pulled away from the entire surface with little effort.

The porosity test showed that, even with a PVDF coating thickness of 980 μm, a number of flashovers were counted. In the case of the desirable coating thicknesses between 400 and 600 μm, the coating was so covered with pores that it was completely unusable for protection against corrosion.

The test results are summed up in Table 1.

EXAMPLE 3

(Comparative Example)

By the procedure described in Examples 1 and 2, coatings were applied to steel plates of the same quality and tested. However, a PVDF powder containing no fillers was used. The coatings had a good surface and, in a thickness of 380 μm, showed only a few isolated flashovers when tested for porosity.

Adhesion, however, after long immersion in hydrochloric acid, proved to be inadequate. At the end of 144 hours, the coating could be lifted and peeled from the entire surface with little effort, and rust appeared on the surface of the plate. Adhesion was completely lost after 24 hours of immersion in boiling water. When the coating was cut with a sharp knife it came away.

Table 1

| | Example No. | | |
|---|---|---|---|
| | 1 | 2 | 3 |
| Surface texture | good | poor | good |
| Immersion in HCl at 80° C. for 24 hours | | | |
| Adhesion | good | very poor | good |
| Rusting | no | yes | some |
| Immersion in HCl at 80° C. for 144 hours | | | |
| Adhesion | good | very poor | poor |
| Rusting | no | yes | some |
| Immersion in H₂O at 100° C. | | | |
| Adhesion | good | poor | poor |
| Rusting | no | no | no |
| Flashovers | | | |
| at 380 μm thickness | 3 | 49 | 2 |
| at 750 μm thickness | — | 12 | — |

Table 1-continued

| | Example No. | | |
|---|---|---|---|
| | 1 | 2 | 3 |
| at 980 μm thickness | — | — | — |

EXAMPLES 4 TO 10

By the procedure described in Example 1, steel plates were coated with PVDF by fluidized bed coating. Either the melt flow index of the PVDF powder was varied, or the ratio of admixture of the glass balls to the PVDF powder. The details relating to the conditions of preparation are shown in Table 2. The coatings obtained all had as good, or nearly as good, adhesion to the substrate as those of Example 1. The surface quality is also to be found in the table.

Table 2

| | Example No. | | | | | | |
|---|---|---|---|---|---|---|---|
| | 4 | 5 | 6 | 7 | 8 | 9 | 10 |
| Glass Type | A | E | E | E | A | A | A |
| PVDF Powder (wt.-parts) | 85 | 80 | 80 | 80 | 70 | 60 | 95 |
| Melt flow index (g/10 min) | 150 | 100 | 50 | 300 | 150 | 150 | 150 |
| Filler (wt.-parts) | 15 | 20 | 20 | 20 | 30 | 40 | 5 |
| Coating thickness (μm) | 750 | 500 | 500 | 800 | 500 | 500 | 500 |
| Surface quality* | 2 | 2 | 3 | 1 | 2 | 3 | 1 |

*Scale:
1 = good; smooth surface with no texture
2 = good; smooth surface slightly textured
3 = moderately good; surface with pronounced texture
4 = poor; heavily textured surface.

EXAMPLE 12

(Comparative Example)

Similarly to Example 9, a steel plate pretreated in the same manner was subjected to fluidized bed coating, the powder composition being a mixture of 60 weight-parts of PVDF powder (grain size spectrum and melt flow index as in Example 9) and 40 weight-parts of quartz sand. The coating obtained showed no fusing together of the powder particles. The particles of the coating had merely sintered together, so that grain boundaries were plainly apparent. The coating was industrially worthless.

EXAMPLES 13

A steel plate measuring 150×60×3 mm, with rounded corners and edges, was sandblasted and degreased in perchlorethylene. Then it was preheated in a circulating air oven at an oven temperature of 300° C. for a period of 15 minutes. The hot plate was then coated by, electrostatic, powder coating with a powder of which 80 wt.—% consisted of PVDF (grain size distribution between 20 and 200 μm, melt flow index 180 g/10 min) and 20 wt.—% of glass balls (grain size between 5 and 70 μm) of type "E" glass. The powder was applied at a voltage of 100 kV and negative charge, first to a thickness of 250 μm. Then the coating was fused for 10 minutes at 300° C. Then another 250 μm, approximately, was applied electrostatically and finally fused for a 15 minute period to form a 500 μm thick coating.

The coating obtained had a smooth surface with only very slight texturing. Adhesion to the steel plate was equal to that of the coating of Example 1.

EXAMPLE 14

The coating powder was an intimate mixture of 80 weight-parts of a PVDF powder with a melt flow index of 120 g/10 min., and a grain size distribution of 80 to 450 μm, and 20 weight-parts of balls of "E" glass of a grain size between 5 and 160 μm. A steel plate of the same dimensions and pretreated in the same manner as in Example 13 was preheated to a surface temperature of 350° C. with the flame of a flame spraying torch operating with the flame of an air-acetylene mixture. Then the powder was delivered by compressed air through the marginal zone of the torch nozzle so that the powder particles were melted by the flame. The temperature of the powder particles was approximately 250° to 300° C., and the powder application was performed in criss-crossing sweeps, in several coats. When the powder application was completed, the surface was smoothed with the open flame.

The coating obtained had a smooth surface with a slight texture. Adhesion to the substrate was good.

EXAMPLE 15

The coating powder in this case was a PVDF powder with a grain size distribution between 60 and 400 μm, and a melt flow index of 170 g/10 min. 80 weight-parts of this powder were intimately mixed with 20 weight-parts of glass balls made of "E" glass, grain size between 5 and 160 μm. This mixture was sprayed with a spray gun onto a steel plate of the same dimensions and pretreated in the same manner as in Example 1, which had been preheated for 20 minutes at 350° C. The spray gun operated on the injector principle with a compressed air feed. The spraying pressure was 1.5 bars. After the powder application, a fusing process was performed for 20 minutes at 300° C.

The coating had a thickness of 600 μm and had a smooth surface with a slight texture.

EXAMPLE 16

A smooth plate of glass of the sme dimensions as the steel plate of Example 1 served as the coating substrate. A coating powder of the same composition as in Example 1 was applied in a manner completely the same as in Example 1. The coating obtained had a smooth surface with a slight texture and adhered tightly to the substrate.

EXAMPLE 17

A smooth, rolled aluminum plate of the same dimensions as the steel plate of Example 1 served as the substrate. A coating powder of the same composition as in Example 1 was applied to this plate in entirely the same manner as in Example 1. The coating obtained had a smooth surface with a slight texture and adhered tightly to the substrate.

EXAMPLE 18

A smooth ceramic tile measuring 150×150×4 mm served as the substrate. A coating powder of the same composition as in Example 1 was applied to this plate in entirely the same manner as in Example 1. The coating obtained was 500 μm thick and had a smooth surface with a slight texture; it adhered well to the substrate.

What is claimed is:

1. In a method of coating a metal or inorganic oxidic surface with a powder resin coating composition, said coating composition being a homopolymer or a copolymer of polyvinylidene fluoride having a melt flow index of 50-300 grams per ten minutes as determined in accordance with ASTM D 1238 Condition J, wherein said powder resin is applied to said surface and fused thereon, the improvement comprising employing with the powder resin coating composition 5-40 parts by weight of glass based upon a total of 100 parts by weight of resin and glass, wherein said glass is in the form of balls or spheres having a particle size of 5-160 μ.

2. A method according to claim 1 wherein the powder coating composition is applied by a fluidized-bed coating process.

3. A method according to claim 1 wherein the powder coating composition is applied by an electrostatic powder coating process.

4. A method according to claim 1 wherein the polyvinylidene fluoride polymer has a particle size of 50 to 450 μm.

5. A method according to claim 1 wherein the polyvinylidene fluoride polymer has a particle size of 20 to 200 μm.

* * * * *